METHOD OF MAKING PNEUMATIC TIRES
Filed Sept. 4, 1956 2 Sheets-Sheet 1
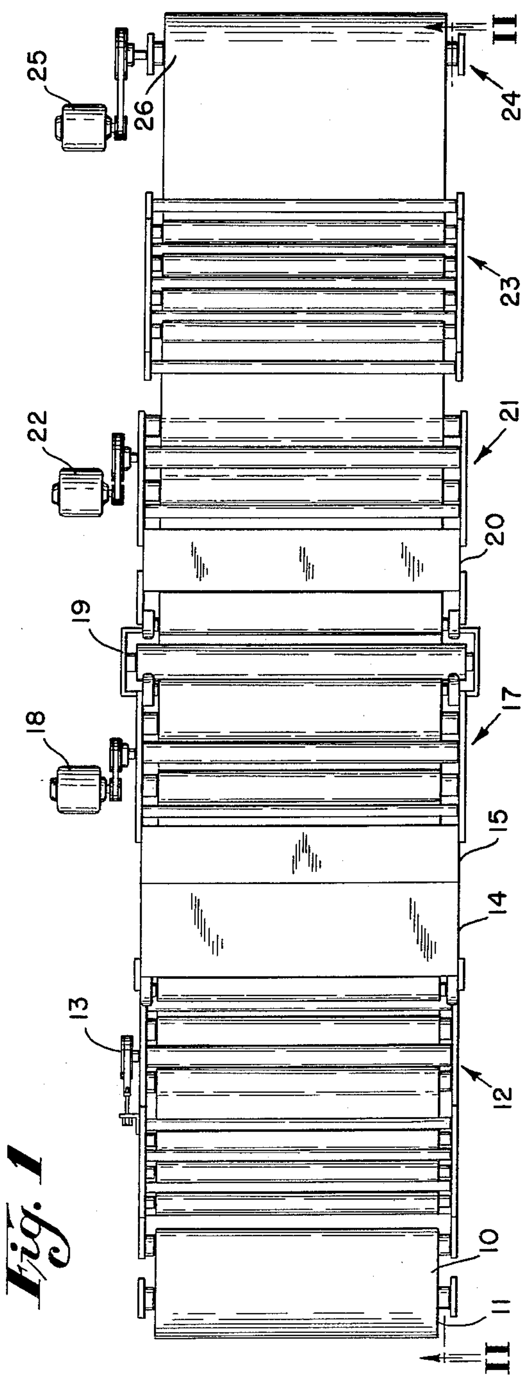
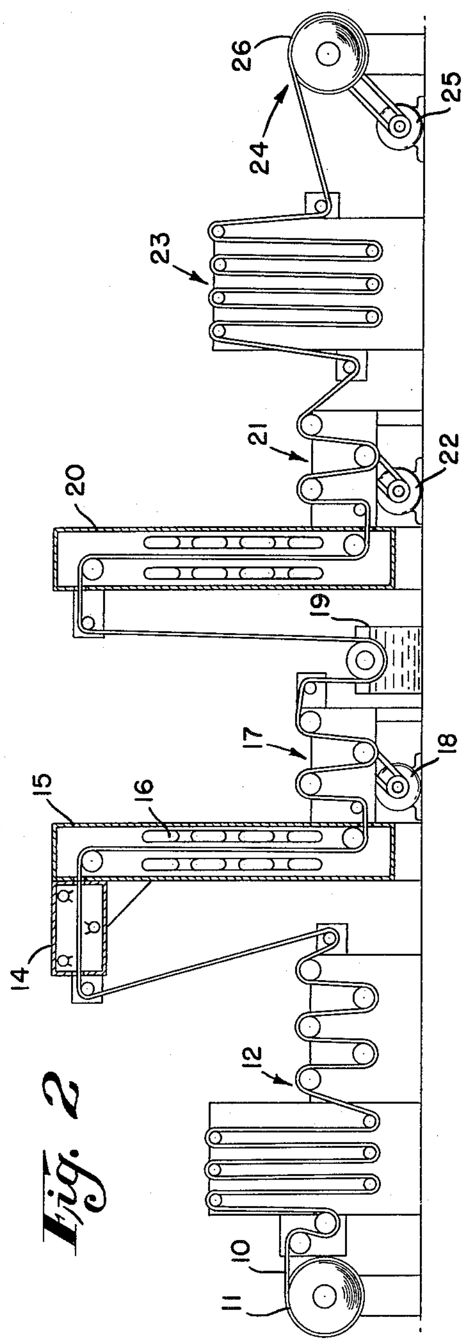
INVENTOR.
ANTHONY J. SAULINO
ANDREW J. McFARLANE
WALTER K. KLAMP
BY James J. Long
AGENT.

Aug. 8, 1961 A. J. SAULINO ET AL 2,995,178
METHOD OF MAKING PNEUMATIC TIRES
Filed Sept. 4, 1956 2 Sheets-Sheet 2
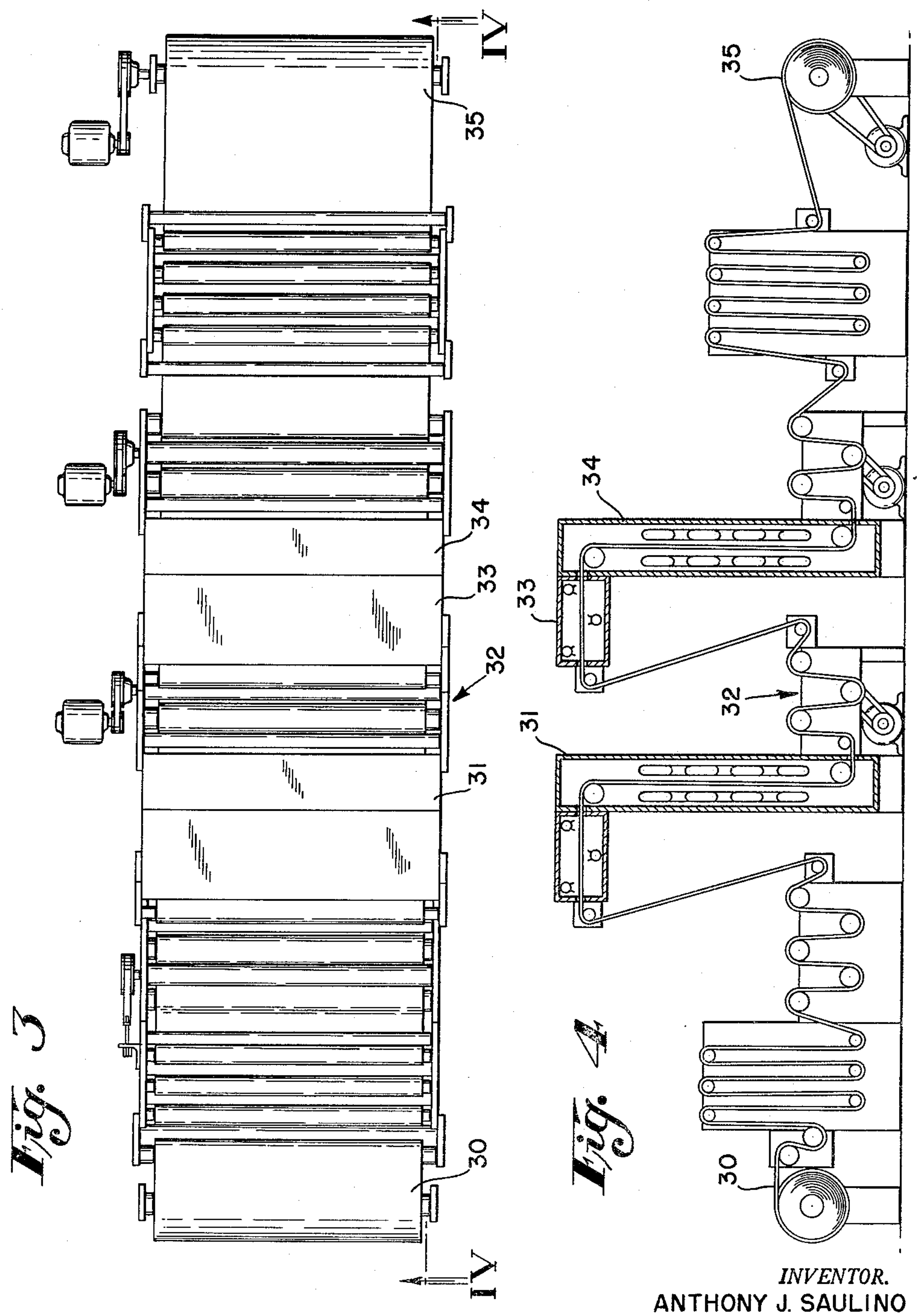
INVENTOR.
ANTHONY J. SAULINO
ANDREW J. McFARLANE
WALTER K. KLAMP
BY James J. Long
AGENT.

United States Patent Office 2,995,178

Patented Aug. 8, 1961

2,995,178

METHOD OF MAKING PNEUMATIC TIRES

Anthony J. Saulino and Andrew J. McFarlane, Detroit, and Walter K. Klamp, Ann Arbor, Mich., assignors to United States Rubber Company, New York, N.Y., a corporation of New Jersey Filed Sept. 4, 1956, Ser. No. 607,914
9 Claims. (Cl. 154—14)

This invention relates to a method of making pneumatic tires, and more particularly it relates to a method of preparing synthetic textile cord fabric for the manufacture of pneumatic tires.

It is known that synthetic fibers such as nylon have many advantages as textile reinforcing materials in the carcass of a pneumatic tire. Compared to cotton or rayon, nylon for example is stronger and has superior rupture resistance. It can be made to adhere well to the rubber stock of the carcass. It resists deterioration by exposure to elevated temperatures and to moisture.

Offsetting the good qualities of nylon and similar synthetic material are its high cost and its tendency to stretch, with the result that tires made from this material tend to "grow" and are subject to excessive groove cracking.

For the purpose of alleviating stretch or growth, and to increase economy, it has been proposed to subject the nylon cord or fabric to a heat-setting operation. The nylon is heated to an elevated temperature while subjecting it to a relatively high tension. This heat-setting treatment is frequently carried out on the nylon cord fabric after the conventional so-called solutioning of the cord fabric, that is, after the cord fabric is passed through the usual adhesive solution, which is ordinarily comprised of rubber latex containing a resorcinol-formaldehyde resin. This adhesive composition, especially after it is dried and set or cured by heat, provides good adhesion between the nylon fabric and the vulcanizable rubber carcass stock which is subsequently calendered onto both sides of the fabric to make the rubberized carcass plies. Such a nylon heat-setting operation is exemplified by U.S. Patent 2,679,088, issued May 25, 1954, to Meherg et al. The heat-setting treatment does give increased economy, and reduces growth, but the results leave much to be desired.

For one thing, it is frequently found in practice that tires made from conventionally heat-set nylon become distorted during the molding of the tire, or upon removal from the mold. Sometimes the nylon fabric carcass plies will actually pull away from the beads around which they are lapped. One object of the invention is to obviate this difficulty.

When using conventionally heat-set nylon to build tires it is necessary to use a wider than usual "shoulder set," that is, it is necessary to use more fabric than would conventionally be used for a tire of a given size. This is undesirable, and therefore it is another important object of the invention to make it unnecessary to build the nylon tire with an unusually wide shoulder set.

Another undesirable feature of conventionally heat-set nylon cord fabric is that when it is wound up in a roll (preparatory to calendering the rubber carcass stock onto the fabric) it tends to shrink to a greater extent toward the edges of the roll, as compared to the middle. Subsequently, as the roll is unwound in order to pass the fabric into the calender, the central portion tends to sag, giving an effect that is described as "baggy nylon." This makes it very difficult to calender the rubber onto the fabric properly, and it gives rise to a characteristic kind of defect, known as "crushed fabric." It is another important object of the invention to eliminate "baggy nylon" and "crushed fabric" defects.

Furthermore, the conventional method of heat-setting nylon fabric for use in tires is carried out after the fabric has been solutioned with the latex-resin adhesive. Since the heat-setting involves temperatures approaching the melting point of the nylon, this means that the adhesive composition on the fabric is subjected to an unusually high temperature, e.g., 380° to 440° F. This not only places certain undesirable limitations on the formulation of the adhesive, but it also tends to degrade the adhesive and to decrease the strength of the adhesive bond obtained. Heat-setting of the adhesive coated cord gives rise to evolution of tarry volatile materials, emanating from the adhesive, which create a ventilation problem and soon produce a gummy deposit on the machinery, necessitating the frequent shutting down of the machinery for cleaning. It is still another object of the invention to eliminate the necessity for carrying out the high temperature heat-setting after the adhesive solution has been applied, thereby avoiding the ill effects on the adhesive and at the same time making for cleaner operating conditions.

Still another undesirable feature of previous heat-setting treatments for nylon cord lies in the fact that the treatments have an adverse effect on the fatigue properties of the nylon, with the result that the tires fail prematurely. It is a further object of the invention to provide a method of preparing nylon for use in tire carcasses, without untoward effect on the fatigue properties.

Another object of the invention is to provide a treated nylon tire fabric that is softer and therefore more readily adaptable to tire building operations than conventionally heat-set nylon.

The manner in which the invention accomplishes the foregoing objects, as well as additional objects and advantages, will be made manifest in the following detailed description, which is intended to be read with reference to the accompanying drawings, wherein:

FIG. 1 is a plan view of an apparatus useful for carrying out a preferred embodiment of the invention;

FIG. 2 is an elevated view of the apparatus of FIG. 1 taken substantially along the line II—II in FIG. 1; and, FIGS. 3 and 4 are views similar to FIGS. 1 and 2, respectively, of an apparatus useful for carrying out a modification of the invention, the view of FIG. 4 being taken substatnially along the line IV—IV in FIG. 3.

In general, the invention contemplates heat-setting the nylon cord to be used in reinforcing the carcass of the pneumatic tire, by heating the grey (i.e., untreated) synthetic textile cord, such as nylon cord, to a temperature approaching the melting range of the nylon, e.g., about 350° to 500° F., while applying sufficient tension to stretch the cord from about 6 to 30% of its original length. The temperature is sufficiently elevated so that the nylon (which is of course thermoplastic) is very soft and readily stretches beyond its elastic limit, although the temperature is of course not so close to the melting point of the nylon that there is danger of the cords actually melting away during the treatment. The period of time required for such high temperature treatment is in no way critical, and it is sufficient simply to expose the cord to the specified elevated temperature for a period of time sufficient for the entire cord to reach the desired temperature at which the stretching is accomplished. The nylon cord is thus "heat-set" in an elongated condition, and the "soft stretch" is permanently removed from the cord.

The heat-set nylon cord fabric is subsequently subjected to a second, milder heat treatment, in which only a very moderate tension is applied to the cords. More specifically, the heat-set cord fabric is heated once again, this time to a more moderate temperature, usually 40 to 100° F. lower than the heat-setting temperature, and preferably about 80° F. lower than heat-setting temperature. The characteristic of this stage of the treatment is that the heat-set nylon cord is heated to a temperature approximating that at which the pneumatic tire is subsequently molded and vulcanized, e.g., a temperature of 300° to 400° F., and preferably about 350° F. Another characteristic of this stage of the treatment is that only a very moderate tension is applied to the cords, e.g., about ¼ to 1 pound per cord. This tension approximates the tension to which the nylon cords are ordinarily subjected when the pneumatic tire is subsequently molded. It will be understood that internal fluid pressure is applied to the interior of a tire casing, usually with the aid of an extensible curing bag or blanket, causing the tire casing to stretch slightly to fill out the mold and conform to the desired shape. The tension applied to the cords at this stage of the treatment is insufficient to resist the tendency of the cords to shrink when heated. The cords shrink by about 2 to 15% of their heat-set length. Thus about ¼ to ½ of the elongation imparted during the heat-setting is lost. The period of time required for such shrinkage heat treatment is in no way critical, and it is in general sufficient simply to expose the cords to the specified elevated temperature for a predetermined period of time sufficient for the entire cord to reach the desired temperature and sufficient for the desired shrinkage to take place at such temperature.

We call this second, milder heat treatment of the previously heat-set nylon cord an "annealing" treatment, and we have found that it has a number of beneficial effects. Perhaps the most important result is that when a tire casing is assembled from the thus "annealed" heat-set nylon cord fabric, and subsequently cured in a mold at a temperature approximating that employed in the "annealing" and under a tension approximating that employed in the "annealing," one does not encounter the distortion of the tire casing and the pulling away of the carcass fabric from the beads, that are so frequently encountered in tires made from ordinary heat-set nylon. This advantage is believed to be a consequence of the fact that under the carefully controlled conditions of temperature and tension applied during the "annealing," the tendency of the nylon to shrink during cure is substantially reduced or eliminated. Thus, by removal of such shrinkage beforehand, subsequent shrinkage of the cords during molding of the tire and consequent distortion and pulling of the carcass plies are forestalled.

Considering in more detail the embodiment of the invention exemplified in FIGS. 1 and 2, it will be observed that the grey nylon cord fabric 10 to be treated is supplied from a roll 11, whence it passes around an assembly 12 of tensioning or festoon rolls that includes an adjustable brake 13 (FIG. 1) to aid in regulating the applied tension.

Preparatory to the heat-setting operation the grey cord fabric may be passed into a steam chamber 14, wherein the fabric is surrounded by and saturated with steam, and is thus moistened and conditioned for the heat treatment. This moist pre-heating has been found to improve greatly the effects of the heat-setting in certain important respects, as will be explained in more detail below. The nylon fabric passes vertically downwardly through a heat-setting chamber 15, containing heater 16 spaced a short distance from opposite faces of the fabric. The grey nylon is thus heated to a temperature of 350° to 500° F. The fabric requires 10 to 120 seconds to traverse the heat-setting chamber.

The fabric next passes out of the heating chamber into an assembly 17 of tensioning and driving rolls driven at a definite speed by a motor 18.

The heat-set nylon fabric next passes into a tank 19 containing conventional latex-resin tire cord adhesive solution, with which the cords become saturated and coated.

Next, the heat-set fabric bearing the adhesive composition passes into an "annealing" heating chamber 20, similar to the heat-setting chamber 15, but maintained at a lower temperature, preferably sufficient to heat the cord to a temperature of about 300° to 350° F., which approximates the temperature at which the tire is to be molded. The fabric takes about 10 to 120 seconds to pass through the "annealing" chamber. In the "annealing" chamber the adhesive composition on the cord dries and cures, but this per se has no essential relation to the "annealing" step, as will become particularly evident when a modification of the invention is described in detail below. The adhesive solution does serve to moisten the fabric and condition it for the "annealing," but otherwise the adhesive and its cure have per se no effect on the "annealing."

After passing from the "annealing" chamber the fabric passes through an arrangement 21 of tensioning and driving rollers driven by a motor 22. The arrangement is such that only a very moderate tension, e.g., about ¼ to 1 pound per cord, is applied to the nylon fabric in the "annealing" section. This tension is of the same order as the tension to which the nylon will be subjected to when the tire is molded. The tension is insufficient to overcome the tendency of the nylon to shrink at this stage, with the result that the fabric shrinks by about 2 to 15% of its heat-set length.

After passing through a festoon arrangement 23, the "annealed" nylon fabric passes into a winding device 24 actuated by a motor 25, where it is wound up into a roll 26.

The modification of the invention shown in FIGS. 3 and 4 is generally similar to the foregoing, except that the adhesive dip is omitted, and the nylon fabric 30 passes from the heat-setting oven 31 and tensioning section 32 into the "annealing" stage without any intermediate application of adhesive solution. In this case the heat-set nylon cord fabric may pass into a steam chamber 33 which precedes the heated "annealing" chamber 34. In the modification, the temperatures, speeds, tensions, elongation and shrinkage may be controlled in the same manner as in the previously described embodiment. The temperature to which the cord is heated in the "annealing" chamber 34 may range from 300° to 400° F. Thereafter the "annealed" nylon cord fabric may be wound up into a roll 35.

Subsequently, the nylon fabric heat-set and "annealed" as in the modification may be solutioned with the tire cord adhesive, and then heated (typically to a temperature of about 250° F.) to dry the adhesive. Such drying has no effect on the previous heat-setting and annealing. The drying temperature for the adhesive solutioned cord is below that which it is necessary to apply during the "annealing." Thus, during a conventional operation of this kind the temperature reached by the cords is usually only about 250° F., which is much too low to accomplish the present purpose. At this stage one of the important advantages of the invention makes itself evident, viz., the heat-set, annealed, and adhesive-treated cord can be heated to drying temperature without losing the benefits of the heat-setting.

After drying, the heat-set, "annealed" nylon cord fabric, bearing the tire cord adhesive, is then passed through the rubber calender (not shown), where vulcanizable rubber carcass stock is applied to each side of the fabric. It is at this stage of the processing that still another important advantage of the invention manifests itself. Usually, heat-set nylon fabric will sag at the center and get "baggy" as it is passed into the calender, due to differential shrinkage of the edges of the fabric, as compared to the center. "Baggy nylon" is the bane of the calender operator and results in defective calendered fabric and defective tires, producing what is called a "crushed fabric"

defect. However, with the "annealed" heat-set nylon of the invention the fabric does not shrink differentially and sag at the calender, and therefore calendered fabric and tires free from the common "crushed-fabric" defect of conventionally heat-set nylon are obtained.

After the carcass stock is calendered onto the fabric, the fabric is cut into pieces of a size suitable for building tires. It will be understood that these fabric pieces, called plies, are applied to a collapsible tire building drum and wrapped around inextensible bead assemblies at the edges of the drum to form the tire carcass in flat band form. The spacing between the beads (i.e., the "shoulder set") and the width of the fabric plies are determined by the desired size of the tire. It is here that a further significant advantage of the invention manifests itself. With conventionally heat-set nylon it is necessary to use unusually wide plies of tire fabric and increased bead spacings, to minimize distortion of the carcass and pulling of the plies away from the beads during cure. However, this has been found unnecessary with the present "annealed" heat-set nylon, which can be applied in plies of conventional width, essentially like rayon, without subsequent detrimental effects.

Another advantage of the invention can be observed at this stage, in that the present tire fabric is unusually soft and flexible or supple, compared to the previously available nylon fabrics, which are quite stiff. The unyielding nature of previously available nylon tire fabric has made it more difficult to build and shape nylon tires properly. In contrast the compliant nature of the fabric prepared by the present method makes it relatively easy to build nylon tires accurately and quickly, without wrinkles or buckles or other defects.

The tire carcass, having the usual vulcanizable tread and sidewall rubber applied thereto, is then shaped in toroidal form and enclosed in a mold for curing. Temperatures of the order of 300° to 500° F. are reached in this operation, and the internal expansive forces exerted on the tire are such that a moderate tension, of the order of about ¼ pound to 1 pound per cord, is exerted on the nylon carcass fabric. As pointed out previously, these conditions parallel those to which the heat-set cord was subjected during the "annealing." As a consequence, the tire does not become distorted during cure and the plies do not tend to shrink and pull away from the beads. When the tire casing is removed from the mold, it is observed to be properly shaped, and free from the defects frequently associated with the use of ordinary heat-set nylon.

Tires made with nylon heat-set and then annealed in the manner described have been found to give unusually good service. The tires do not "grow" as severely in service under the influence of continually applied inflation pressures, nor are they subject to as much groove-cracking. When run on a test wheel in a fabric fatigue test, tires made in accordance with the invention lasted 95 hours, compared to 50 to 60 hours for nylon that had not been heat-set, and only 12 hours for nylon that had been conventionally heat-set. It will be observed from these figures that conventionally heat-set nylon is actually poorer in fatigue properties than untreated nylon. In contrast, the present heat-set and "annealed" nylon is better than untreated nylon in fatigue resistance.

Not the least of the advantages of the invention lies in the fact that it enables the high temperature heat-setting to be carried out prior to the latex solutioning of the nylon cord. The conventional method of heat-setting the nylon subsequent to the latex solutioning gave rise to difficulties in the compounding of the latex solution, because the adhesive material was subjected to such high temperatures during the heat-setting. The adhesive solution exposed to such high heat-setting temperatures is very adversely affected. Not only do volatile gummy materials evolving from the adhesive solution at such high temperatures cause fouling of the equipment but the solution itself is baked to the extent that it forms a hard crust on the cord, that causes subsequent tire failures. With the present process, in contrast, the heat-setting can be carried out prior to the latex solutioning, thereby avoiding exposure of the solutioned cord to high heat-setting temperatures. Subsequent solutioning, either before or after the annealing, has no adverse effect.

It should be noted that the temperatures alluded to herein refer to cord temperatures, and not necessarily to temperatures of the medium in which the cord is heated. The latter temperatures may be much greater.

Having thus described our invention, what we claim and desire to protect by Letters Patent is:

1. A method of preparing nylon cord fabric for use in pneumatic tires comprising heat-setting the nylon fabric by heating it over a first predetermined period of time to a temperature approaching the melting range of the nylon while stretching said fabric from 6 to 30% of its original length, cooling the fabric and thereafter heating the fabric over a second predetermined period of time to a temperature from 40° to 100° F. lower than the temperature applied during the heat-setting, while applying to the fabric a moderate tension of from ¼ to 1 pound per cord.

2. A method of preparing nylon cord for use in the manufacture of pneumatic tires comprising heating the cord over a first predetermined time interval to a temperature of from 350° to 500° F. while stretching the cord from about 6 to 30% of its original length, thereafter applying a latex adhesive solution to the cord, and thereafter heating the cord over a second predetermined time interval to a temperature of 300° to 350° F. while applying a tension of about ¼ to 1 pound per cord, whereby the cord shrinks by about 2 to 15% of its length after said stretching.

3. A method of preparing nylon cord for use in the manufacture of pneumatic tires comprising heating the cord over a first predetermined time interval to a temperature of from 350° to 500° F. while stretching the cord from about 6 to 30% of its original length, thereafter heating the cord over a second predetermined time interval to a temperature of 300° to 400° F. while applying a tension of about ¼ to 1 pound per cord, thereafter applying a latex adhesive solution to the cord, and drying the cord.

4. A method of making a pneumatic tire comprising preparing nylon cord by heating the cord over a first predetermined time interval to a temperature of from 350° to 500° F. while stretching the cord from about 6 to 30% of its initial length, thereafter applying a latex adhesive solution to the cord, thereafter heating the cord over a second predetermined time interval to a temperature of 40° to 100° F. lower than the aforesaid temperature while applying a tension of about ¼ to 1 pound per cord, incorporating the cord in a vulcanizable rubber tire casing, and vulcanizing the casing in tire shape.

5. A method of making a pneumatic tire comprising preparing nylon cord by heating the cord for a first predetermined period of time to a temperature of from 350° to 500° F. while stretching the cord from about 6 to 30% of its initial length, thereafter heating the cord for a second predetermined period of time to a temperature 40° to 100° F. lower than the aforesaid temperature while applying a tension of about ¼ to 1 pound per cord, thereafter applying a latex adhesive solution to the cord, thereafter drying the cord, incorporating the cord in a vulcanizable rubber tire casing, and vulcanizing the casing in tire shape.

6. A method of making a pneumatic tire comprising preparing nylon cord by passing the cord through an atmosphere of steam to moisten the cord, heating the cord for a first predetermined period of time to a temperature of from 350° to 500° F. while stretching the cord from about 6 to 30% of its initial length, thereafter applying a latex adhesive solution to the cord, thereafter heating the cord for a second predetermined period of time to a temperature 40° to 100° F. lower than the aforesaid temperature while applying a tension of about 1/4 to 1 pound per cord, incorporating the cord in a vulcanizable rubber tire casing, and vulcanizing the casing in tire shape.

7. A method of making a pneumatic tire comprising preparing nylon cord by passing the cord through an atmosphere of steam to moisten the cord, heating the cord for a first predetermined period of time to a temperature of from 350° to 500° F. while stretching the cord from about 6 to 30% of its initial length, thereafter passing the cord again through an atmosphere of steam to moisten it, thereafter heating the cord for a second predetermined period of time to a temperature 40° to 100° F. lower than the aforesaid temperature while applying a tension of about 1/4 to 1 pound per cord, thereafter applying a latex adhesive solution to the cord, thereafter drying the cord, incorporating the cord in a vulcanizable rubber tire casing, and vulcanizing the casing in tire shape.

8. A method of making a pneumatic tire comprising assembling a nylon cord fabric, advancing a running length of said cord fabric continuously through a zone in which said cord fabric is heated during a first predetermined time interval to a temperature of from 350° to 500° F. while stretching the cord fabric in said zone from about 6 to 30% of its original length, thereafter continuously advancing said cord fabric through a bath of latex adhesive solution, thereafter continuously advancing said cord fabric through a zone in which the cord fabric is heated during a second predetermined time interval to a temperature of from 300° to 350° F. while applying a tension of about 1/4 to 1 pound per cord whereby the cord fabric shrinks by about 2 to 15% of its length after said stretching, incorporating the said cord fabric in a vulcanizable rubber tire casing, and vulcanizing the casing in tire shape.

9. A method of making a pneumatic tire comprising assembling a nylon cord fabric, advancing a running length of said cord fabric continuously through a zone in which said cord fabric is heated during a first predetermined time interval to a temperature of from 350° to 500° F. while stretching the cord fabric in said zone from about 6 to 30% of its original length, thereafter continuously advancing said cord fabric through a zone in which the cord fabric is heated during a second predetermined time interval to a temperature of from 300° to 400° F. while applying a tension of about 1/4 to 1 pound per cord whereby the cord fabric shrinks by about 2 to 15% of its length after said stretching, thereafter continuously advancing said cord fabric through a bath of latex adhesive solution, drying said cord fabric, incorporating the said cord fabric in a vulcanizable rubber tire casing, and vulcanizing the casing in tire shape.

References Cited in the file of this patent

UNITED STATES PATENTS

| | | |
|---|---|---|
| 2,307,846 | Miles | Jan. 12, 1943 |
| 2,370,874 | Playford | Mar. 6, 1945 |
| 2,509,741 | Miles | May 30, 1950 |
| 2,514,187 | Bosomworth | July 4, 1950 |
| 2,679,088 | Meherg et al. | May 25, 1954 |
| 2,754,887 | Wykoff | July 17, 1956 |
| 2,807,863 | Schenker | Oct. 1, 1957 |
| 2,844,488 | Meherg et al. | July 22, 1958 |
| 2,846,752 | Lessig | Aug. 12, 1958 |
| 2,880,057 | Cuculo | Mar. 31, 1959 |
| 2,932,078 | Wilson | Apr. 12, 1960 |

FOREIGN PATENTS

| | | |
|---|---|---|
| 147,484 | Australia | May 5, 1949 |
| 323,790 | Great Britain | Jan. 16, 1930 |

OTHER REFERENCES

Modern Plastics (January 1951), article entitled "Monofilaments"; pages 87 and 90 relied upon.

Fryer, R. E.: "High Temperature Heat Treatment of Nylon Fabrics," Textile Manufacturer, August 1951, pages 404–406.

Litzler, C. A.: "Better Tires From Modern Tire Cord," Modern Textiles, February 1954, pages 33, 32, 39, 54, 57, 58, 60, 62, 64 and 66.